(12) United States Patent
Schwarzband et al.

(10) Patent No.: US 8,098,926 B2
(45) Date of Patent: Jan. 17, 2012

(54) METHOD AND SYSTEM FOR EVALUATING AN EVALUATED PATTERN OF A MASK

(75) Inventors: Ishai Schwarzband, Or-Yehuda (IL); Shmoolik Mangan, Rehovot (IL); Chaim Braude, Nes-Ziona (IL); Michael Ben-Yishai, Natanya (IL); Gadi Greenberg, Tel Aviv (IL)

(73) Assignee: Applied Materials Israel, Ltd., Rehovot (IL)

( * ) Notice: Subject to any disclaimer, the term of this patent is extended or adjusted under 35 U.S.C. 154(b) by 1045 days.

(21) Appl. No.: 11/971,209

(22) Filed: Jan. 8, 2008

(65) Prior Publication Data

US 2008/0166038 A1     Jul. 10, 2008

Related U.S. Application Data

(60) Provisional application No. 60/884,308, filed on Jan. 10, 2007.

(51) Int. Cl.
*G06K 9/00* (2006.01)
(52) U.S. Cl. .......................... 382/144; 382/203; 382/209
(58) Field of Classification Search .................. 382/144, 382/203, 209
See application file for complete search history.

(56) References Cited

U.S. PATENT DOCUMENTS 6,226,417 B1 *   5/2001   Yamagata et al. ............ 382/289
* cited by examiner

*Primary Examiner* — Hoa Pham
(74) *Attorney, Agent, or Firm* — SNR Denton US LLP

(57) ABSTRACT

A method, system and a computer program product for evaluating an evaluated pattern of a mask, the method includes: receiving multiple moments that represent an image of the evaluated pattern; wherein a size of information required for representing the multiple moments is substantially smaller than a size of pixel information that form the image of the evaluated pattern; and processing the multiple moments in order to determine at least one shape parameter of the evaluated pattern.

27 Claims, 4 Drawing Sheets

METHOD AND SYSTEM FOR EVALUATING AN EVALUATED PATTERN OF A MASK

CROSS-REFERENCE TO RELATED APPLICATION

The present patent application is a Non-Provisional of, claims priority to and incorporates by reference U.S. Patent Application No. 60/884,308, filed 10 Jan. 2007.

FIELD OF THE INVENTION

This invention is generally in the field of automatic optical inspection of masks (also referred to as reticles).

BACKGROUND OF THE INVENTION

The performance of micro-electronic devices has always been limited by the variations found in the dimensions of their critical features, termed critical dimensions or CD. Micro-electronic devices are often manufactured using masks (or reticles) in a photolithography process. The latter is one of the principal processes in the manufacture of semiconductor devices, and consists of patterning the wafer's surface in accordance with the circuit design of the semiconductor devices to be produced. Such a circuit design is first patterned on a mask. Hence, in order to obtain operating semiconductor devices, the mask must be defect free. Moreover, the mask is often used in a repeated manner to create many dies on the wafer. Thus, any defect on the mask will be repeated multiple times on the wafer and will cause multiple devices to be defective. Establishing a production-worthy process requires tight control of the overall lithography process. Within this process, CD control is a determining factor with respect to device performance and yield.

When the critical dimensions are large, systematic variations in the dimensions of the device, such as those caused by material physics or as a result of equipment or the production process, do not make large contributions to the overall error budget and can therefore be largely ignored. However, as the minimum size of critical features drops below about 65 nm, systematic variations that were previously ignored can now consume a considerable portion of the overall error budget. Specifically, systematic mask CD errors can consume over 50% of the total wafer lithography process CD budget.

Typical CD measurements are time consuming and involve complex image processing schemes of images that include a large number of pixels.

There is a need to provide efficient systems and methods for evaluating an evaluated pattern of a mask.

SUMMARY OF THE INVENTION

A method for evaluating an evaluated pattern of a mask, the method includes: receiving multiple moments that represent an image of the evaluated pattern; wherein a size of information required for representing the multiple moments is substantially smaller than a size of pixel information that form the image of the evaluated pattern; and processing the multiple moments in order to determine at least one shape parameter of the evaluated pattern.

Conveniently, the processing includes determining moment differences between the multiple moments of the evaluated pattern and multiple nominal moments; wherein the multiple nominal moments represent an image of a nominal pattern.

Conveniently, the processing includes determining pattern differences between the evaluated pattern and the nominal pattern in response to the moment differences.

Conveniently, the method includes determining the pattern differences in response to a mapping function that maps moment differences to pattern differences.

Conveniently, the mapping function is a linear function.

Conveniently, the determining is responsive to a model of an optical system that acquired the image of the evaluated pattern.

Conveniently, the method includes determining a mapping function that maps moment differences to pattern differences.

Conveniently, the determining of the mapping function includes: simulating a plurality of alterations of the nominal pattern to provide a plurality of altered patterns; calculating a plurality of groups of moments, whereas each group of moments represents an image of an altered pattern out of the plurality of altered patterns; determining a plurality of relationships each relationship links pattern differences between the nominal pattern and a certain altered pattern and moment differences between the multiple nominal moments and a group of moments that represent the image of the certain altered pattern; and determining the mapping function in response to at least: two relationships out of the plurality of relationships.

Conveniently, the processing includes providing a representation of the contour of the evaluated pattern that includes multiple vectors; each vector bisects an angle that is defined by a nominal contour.

Conveniently, the method includes calculating differences between a shape parameter of each evaluated pattern out of multiple evaluated patterns of an object. Thus, instead of comparing each evaluated pattern to a nominal pattern one evaluated pattern can be compared to another.

Conveniently. The method includes comparing between multiple moments of different evaluated patterns in order to determine at least one shape parameter of an evaluated pattern. This comparison can be used to map shape variations across an entire object or across various areas of an object.

A system for evaluating a evaluated pattern of a mask, the system includes: (i) an memory unit adapted to store multiple moments that represent an image of the evaluated pattern; wherein a size of information required for representing the multiple moments is substantially smaller than a size of pixel information that form the image of the evaluated pattern; and (ii) a processor that is adapted to process the multiple moments in order to determine at least one shape parameter of the evaluated pattern.

Conveniently, the processor is adapted to determine moment differences between the multiple moments of the evaluated pattern and multiple nominal moments; wherein the multiple nominal moments represent an image of a nominal pattern.

Conveniently, the processor is adapted to determine images differences between the image of the evaluated pattern and the image of the nominal pattern in response to the moment differences.

Conveniently, the processor is adapted to determine the images differences in response to a mapping function that maps images differences to moment differences.

Conveniently the mapping function is a linear function.

Conveniently the processor is adapted to determine the moment differences in response to a model of an optical system that acquired the image of the evaluated pattern.

Conveniently, the processor is adapted to determine a mapping function that maps moment differences to pattern differences.

Conveniently, the system is adapted to: simulate a plurality of alterations of the nominal pattern to provide a plurality of altered patterns; calculate a plurality of groups of moments; each group of moments represents an image of an altered pattern out of the plurality of altered patterns; determine a plurality of relationships; each relationship links a differences between the nominal pattern and an altered pattern and a differences between the multiple nominal moments and the a group of moments that represent the image of the altered pattern; and determine the mapping function in response to at least two relationships out of the plurality of relationships.

Conveniently, the processor is adapted to provide a representation of the contour of the evaluated pattern that comprises multiple vectors; each vector bisects an angle that is defined by a nominal contour.

Conveniently, the processor is adapted to calculate differences between a shape parameter of each evaluated pattern out of multiple evaluated patterns of an object.

Conveniently, the processor is adapted to compare between multiple moments of different evaluated patterns in order to determine at least one shape parameter of an evaluated pattern.

A computer program product that includes a computer useable medium having a computer readable program, wherein the computer readable program, when executed on a computer, causes the computer to: receive or calculate multiple moments that represent an image of the evaluated pattern; wherein a size of information required for representing the multiple moments is substantially smaller than a size of pixel information that form the image of the evaluated pattern; and process the multiple moments in order to determine at least one shape parameter of the evaluated pattern.

Conveniently, the computer program product causes the computer to: determine moment differences between the multiple moments of the evaluated pattern and multiple nominal moments; wherein the multiple nominal moments represent an image of a nominal pattern.

Conveniently, the computer program product causes the computer to determine pattern differences between of the evaluated pattern and the nominal pattern in response to the moment differences.

Conveniently, the computer program product causes the computer to determine the pattern differences in response to a mapping function that maps moment differences to pattern differences.

Conveniently, the mapping function is a linear function.

Conveniently, the computer program product causes the computer to determine the moment differences, in response to a model of an optical system that acquired the image of the evaluated pattern.

Conveniently, the computer program product causes the computer to determine a mapping function that maps images differences to pattern differences.

Conveniently, the computer program product causes the computer to simulate a plurality of alterations of the nominal pattern to provide a plurality of altered patterns; calculate a plurality of groups of moments; each group of moments represents an image of an altered pattern out of the plurality of altered patterns; determine a plurality, of relationships; each relationship links a differences between the nominal pattern and an altered pattern and a differences between the multiple nominal moments and the a group of moments that represent the image of the altered pattern; and determine the mapping function in response to at least two relationships out of the plurality of relationships.

Conveniently, the computer program product causes the computer to provide a representation of the contour of the evaluated pattern that comprises multiple vectors; each vector bisects an angle that is defined by a nominal contour.

Conveniently, the computer program product causes the computer to calculate differences between a shape parameter of each evaluated pattern out of multiple evaluated patterns of an object.

Conveniently, the computer program product causes the computer to compare between multiple moments of different evaluated patterns in order to determine at least one shape parameter of an evaluated pattern.

DESCRIPTION OF THE DRAWINGS

In order to understand the invention and to see how it may be carried out in practice, an embodiment will now be described, by way of non-limiting example only, with reference to the accompanying drawings, in which.

DETAILED DESCRIPTION OF EXEMPLARY EMBODIMENTS

A method, system and computer program product for evaluating an evaluated pattern of a mask are provided. Conveniently, the one or more structural elements of the evaluated pattern and especially the contour of an evaluated pattern can be evaluated in a relatively fast manner. The results of this evaluation can be used for CD measurements, evaluating CD variations across a mask (or a portion of the mask), comparing a desired mask layout to an actual mask layout, modeling a layout of a wafer produced with a mask, and the like.

Conveniently, an image of an evaluated pattern of a mask is represented by multiple moments. The multiple moments can differ from each other. The size of information required for representing these multiple moments is substantially smaller than a size of pixel information that form the image of the pattern. This size reduction (also referred to as compression) can contribute to speeding up the evaluation process, as a smaller amount of information is being stored, retrieved and processed.

Conveniently, each moment is responsive to multiple pixels of the image of the pattern thus contributing to the reduction of random noise. A pattern and especially the contour of the pattern includes one or more systematic components, reflecting the design intention and substantial technological factors, and one or more random components, changing from one instant of a pattern to other, e.g. ripples on the feature contour. Using multiple moments allows a restoration of the systematic component of a contour of a pattern.

According to an embodiment of the invention, the pattern that is being evaluated is a part of an array of ideally identical (repetitive) patterns.

It is noted that when multiple moments are compared to other multiple moments then each moment is compared to a corresponding moment. The same applied to differences between moments—the difference is calculated between corresponding moments.

Conveniently, the execution of method 100 and especially some approximations of mapping function f may require that the sizes of the evaluated pattern can deviate within a relatively small range. Conveniently, the difference between the actual layout of the mask (that includes evaluated patterns) and the nominal layout (that includes nominal patterns) is not very large.

The term "pattern differences" can mean one or more differences between two or more patterns. The term "moment differences" can mean one or more differences between two or more moments, wherein the two or more moments can be associated with tow or more images.

Figure 1:
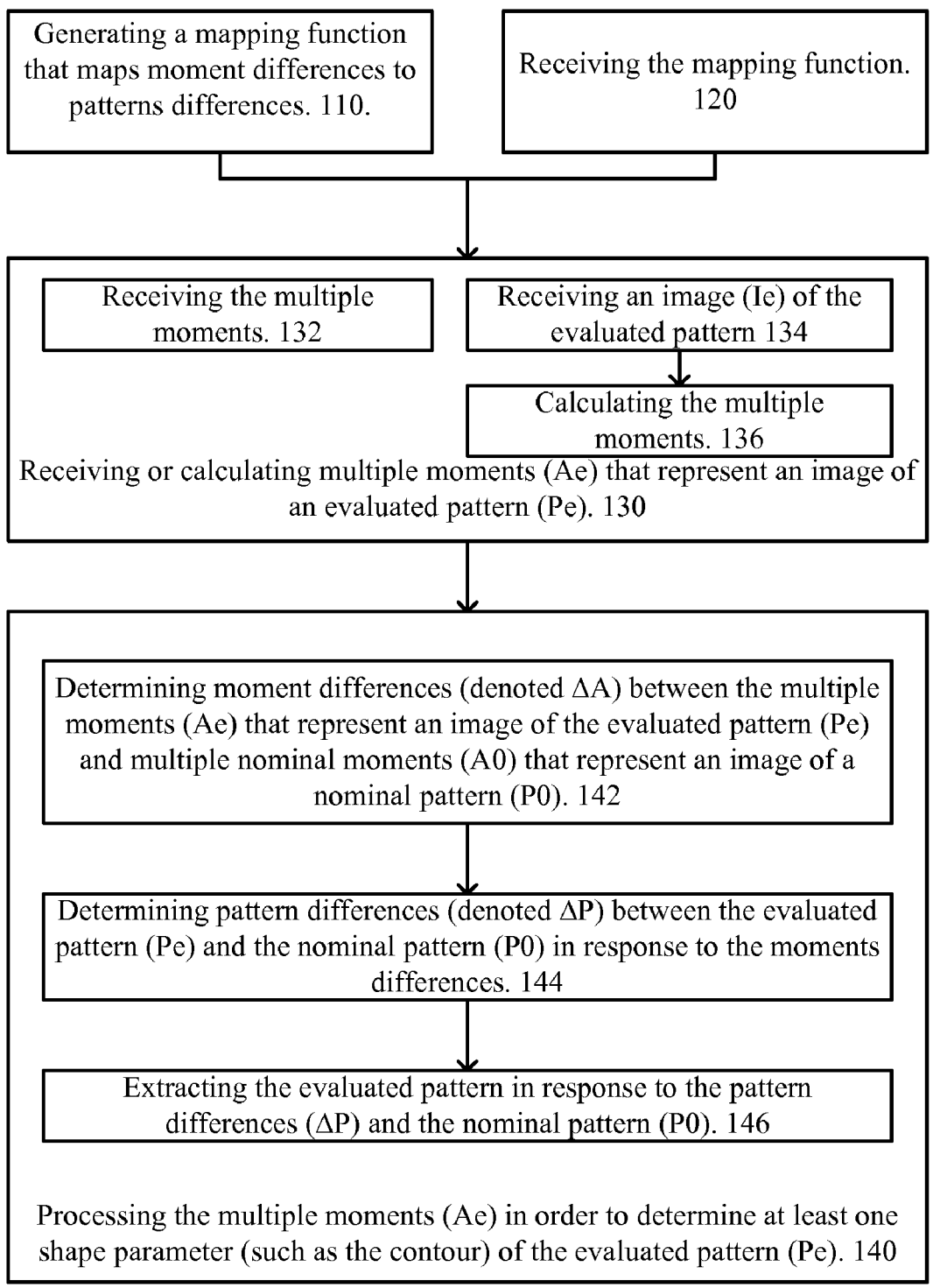
FIG. 1 illustrates a method for evaluating a pattern of a mask according to an embodiment of the invention.

FIG. 1 illustrates a method 100 for evaluating a pattern of a mask according to an embodiment of the invention. This pattern is also referred to as an evaluated pattern in order to differentiate between this pattern and the nominal pattern.

Method 100 starts by either one of stages 110 and 120.

Stage 110 includes generating a mapping function that maps moment differences to pattern differences. Pattern differences are the differences between an evaluated pattern of a mask and a nominal pattern of the mask (also referred to as an ideal pattern or a desired pattern).

An image of an evaluated pattern as well as an image of a nominal pattern can be represented by multiple moments. Moment differences reflect the differences between multiple moments that represent an image of a pattern and multiple moments that represent an image of a nominal pattern.

Each moment (can also referred to as a generalized moment) can have the following form:

$$A^{(k)} \equiv \sum_{x,y} a_{x,y}^{(k)} \cdot s_{x,y}$$

$A^{(k)}$ is the k'th moment, whereas index K is a positive integer that is greater than one but is conveniently smaller and even much smaller that the number of pixels (X×Y) of an image of a pattern. Indices x and y represent the rows and columns of the image of a pattern. $S_{x,y}$ is a pixel that is belongs to the x'th row and at the y'th column of the image. Pixels such as pixel $S_{x,y}$ form the pixel information of the image.

Variable $a^{(k)}$ is the weight (of the k'th moment) assigned to $S_{x,y}$.

The weights can be chosen a priori or be matched with the patterns of a given mask. A priori weights can be chosen, for example, according to so called statistical moments well known in image processing, e.g. Zernike, Legendre, Chebyshev moments etc.

Figure 2:
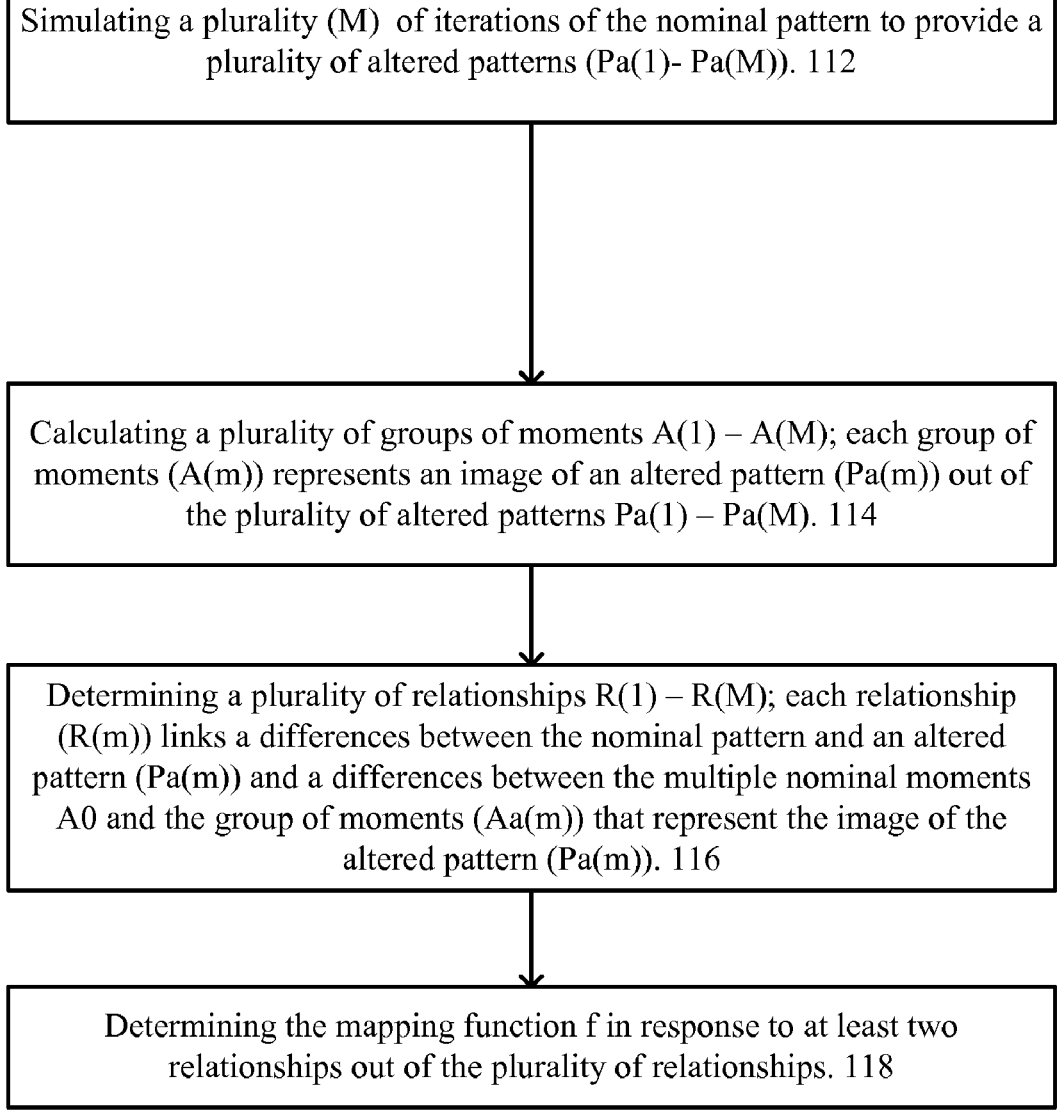
FIG. 2 illustrates a stage of generating a mapping function that maps moment differences to pattern differences according to an embodiment of the invention.

FIG. 2 illustrates stage 110 in greater details according to an embodiment of the invention.

Stage 110 includes: (i) stage 112 of simulating a plurality (M) of alterations of the nominal pattern to provide a plurality of altered patterns (Pa(1)-Pa(M)); (ii) stage 114 of calculating a plurality of groups of moments A(1)-A(M); each group of moments (A(m)) represents an image of an altered pattern (Pa(m)) out of the plurality of altered patterns Pa(1)-Pa(M); (iii) stage 116 of determining a plurality of relationships R(1)-R(M); each relationship (R(m)) links a differences between the nominal pattern and an altered pattern (Pa(m)) and a differences between the multiple nominal moments A0 and a group of corresponding moments (Aa(m)) that represent the image of the altered pattern (Pa(m)), and (iv) stage 118 of determining the mapping function f in response to at least two relationships out of the plurality of relationships.

Conveniently, stage 110 is executed in an iterative manner. During each iteration an altered pattern (Pa(m)) is simulated, a group of moments (Aa(m)) that represent the image of that altered pattern (Pa(m)) is calculated, a relationship (R(m)) between a differences between the nominal pattern (P0) and the altered pattern (Pa(m)) and a differences between the multiple nominal moments (A0) and a group of moments (Aa(m)) that represent the image of the altered pattern is calculated. After each iteration the method determines whether to slop the iterations or to execute another iteration for another altered pattern (Pa(m+1)). The iterations can be stopped once the mapping function is found or when a predefined number of iterations (M) are executed.

Stage 120 includes receiving the mapping function.

Stages 110 and 120 are followed by stage 130 of receiving or calculating multiple moments (Ae) that represent an image of an evaluated pattern (Pe). Stage 130 can include (as illustrated by box 132) receiving these multiple moments but can also include receiving (as illustrated by box 134) an image (Ie) of the evaluated pattern and calculating (as illustrated by box 136) these multiple moments.

Conveniently, a size of information required for representing the multiple moments is substantially smaller than a size of pixel information that form the image of the structural pattern.

Stage 130 is followed by stage 140 of processing the multiple moments (Ae) in order to determine shape parameters (such as the contour) of the evaluated pattern (Pe).

Stage 140 conveniently includes at least one stage out of stage 142, 144 and 146.

Stage 142 includes determining moment differences (denoted ΔA) between the multiple moments (Ae) that represent an image of the evaluated pattern (Pe) and multiple nominal moments (A0) that represent an image of a nominal pattern (P0). It is noted that A includes all K moments $A^{(1)}$ till $A^{(K)}$. A can be a vector but this is not necessarily so. A0 includes all K nominal moments $A0^{(1)}$ till $A0^{(K)}$. A0 can be a vector but this is not necessarily so.

Stage 144 includes determining pattern differences (denoted ΔP) between the evaluated pattern (Pe) and the nominal pattern (P0) in response to the moment differences. The pattern differences are also referred to as differences parameters (DP).

Stage 144 can include determining the pattern differences in response to a mapping function f that maps possible moment differences (possible ΔA) to possible pattern differences (possible ΔP).

The mapping function f can take into account a model of an optical system that evaluated the image of the pattern. This model should be used as the moments represent images acquired by the optical system while the pattern differences represent the patterns that cause these images to be obtained.

It is noted that in cases where the differences between the evaluated pattern and the nominal pattern are small then function f can be linear function: ΔP=f(ΔA)=C×ΔA. It is noted that ΔA and ΔP can be represented by vectors while C can be a matrix.

It is noted that an inverse mapping function ($f^{-1}$) can be used to extract the moment differences once pattern differences are known. In mathematical terms ΔA=$f^{-1}$(ΔP).

It is noted that in cases where the differences between the evaluated pattern and the nominal pattern are small then function $f^{-1}$ can be linear function: ΔP=f(ΔA)=C×ΔA. It is noted that ΔA and ΔP can be represented by vectors while C can be a matrix.

It is noted that other approximations (non-linear) of mapping function f can be applied mutatis mutandis. For example, when the linear approximation is not accurate enough a quadratic component of decomposition of f(ΔA) can be used in order to approximate mapping function f. It is noted that ΔA and ΔP can be represented by vectors and $\Delta P=f(\Delta A)=B\times\Delta A\times B^{-1}$.

Once the pattern differences is known the shape of the pattern can be extracted by adding (or subtracting) these differences from the nominal pattern, as illustrated by stage 146 of extracting the evaluated pattern in response to the pattern differences (ΔP) and the nominal pattern (P0).

It is noted that the pattern differences (ΔP) between an evaluated pattern (Pe) and the nominal pattern (P0) can be represented in various manners. These representations are usually concise and require a relatively small storage space.

According to yet another embodiment of the invention the contour of the pattern is represented by piecewise line interpolation the contour of the pattern.

A representation of a contour of an evaluated pattern includes differences between edges of the contour of the evaluated pattern and corresponding vertices of the nominal pattern.

According to an embodiment of the invention these differences are represented by an edge bias and an edge radius. The nominal pattern is represented by a polygon (especially by listing the vertices of the polygon) and the differences between the evaluated pattern and the nominal pattern is represented by edges that are displaced by some bias and each corner is rounded by some radius of corner rounding. In this case ΔP can include a list of biases and radii.

Yet according to another embodiment of the invention the pattern differences (ΔP) can be defined as the displacements (Δx, Δy) of the evaluated pattern coordinates. Thus, if the evaluated pattern is higher than expected, lower than expected, shifted to the right or to the left this shift is represented by such a pair of x and y coordinates.

Figure 3:
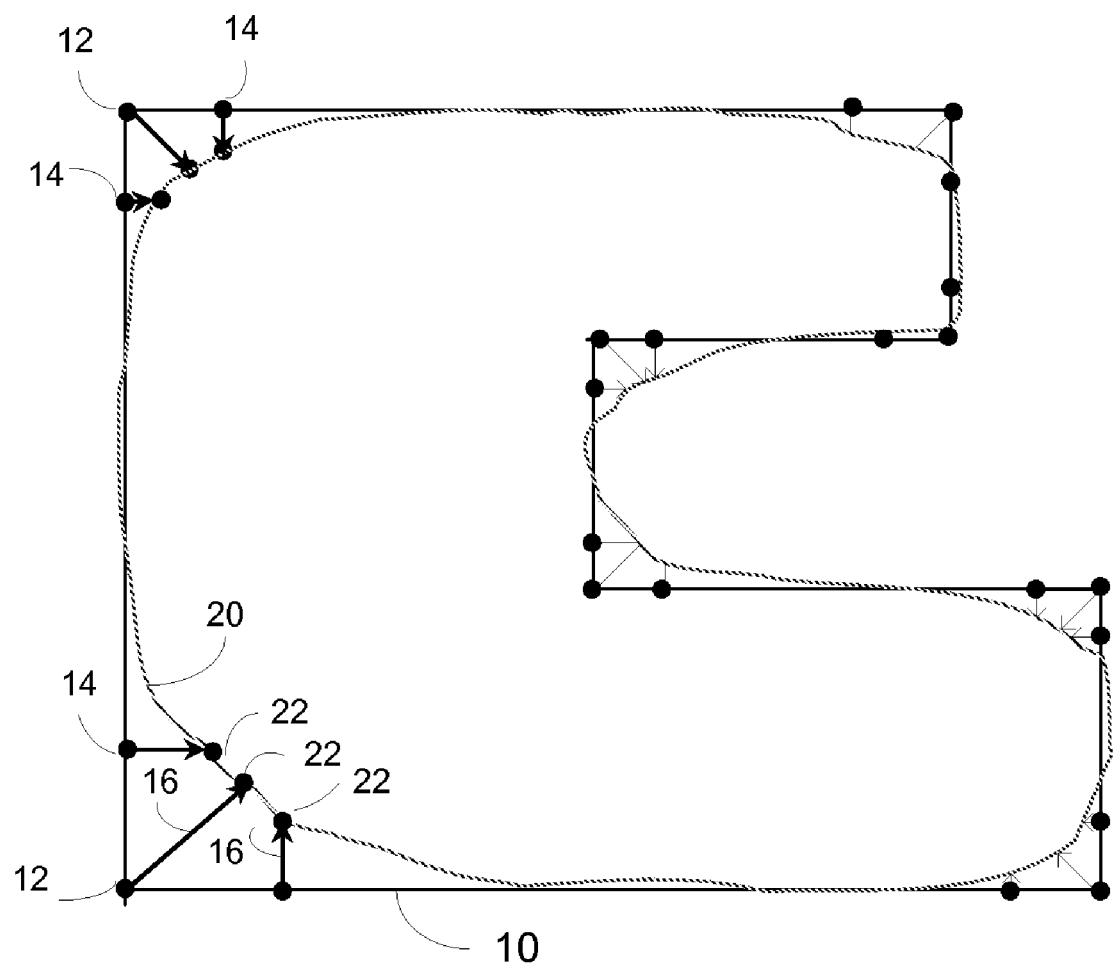
FIG. 3 illustrates a nominal pattern and an evaluated pattern.

According to a further embodiment of the invention these pattern differences are represented by multiple vectors, each vector bisects an angle that is defined by a pair of polygon lines that define the vertex. FIG. 3 illustrates a nominal pattern 10 and an evaluated pattern 20. Nominal pattern 10 has eight vertices 12. Twenty four reference points are defined on nominal pattern 10, eight located at the vertices 12 while eight pairs 14 of reference points are located at different lines that extend from each vertex. Imaginary lines 16 extend from each reference point of the eight pairs and intersect evaluated pattern 20 at intersection points 22. Each imaginary line 18 bisects the angle that is defined by two lines that are connected to form the vertex. Each imaginary line 18 intersects evaluated pattern 20 at vertex intersection points 24. ΔP can include a representation of imaginary lines 18 and optionally also imaginary lines 16.

Figure 4:
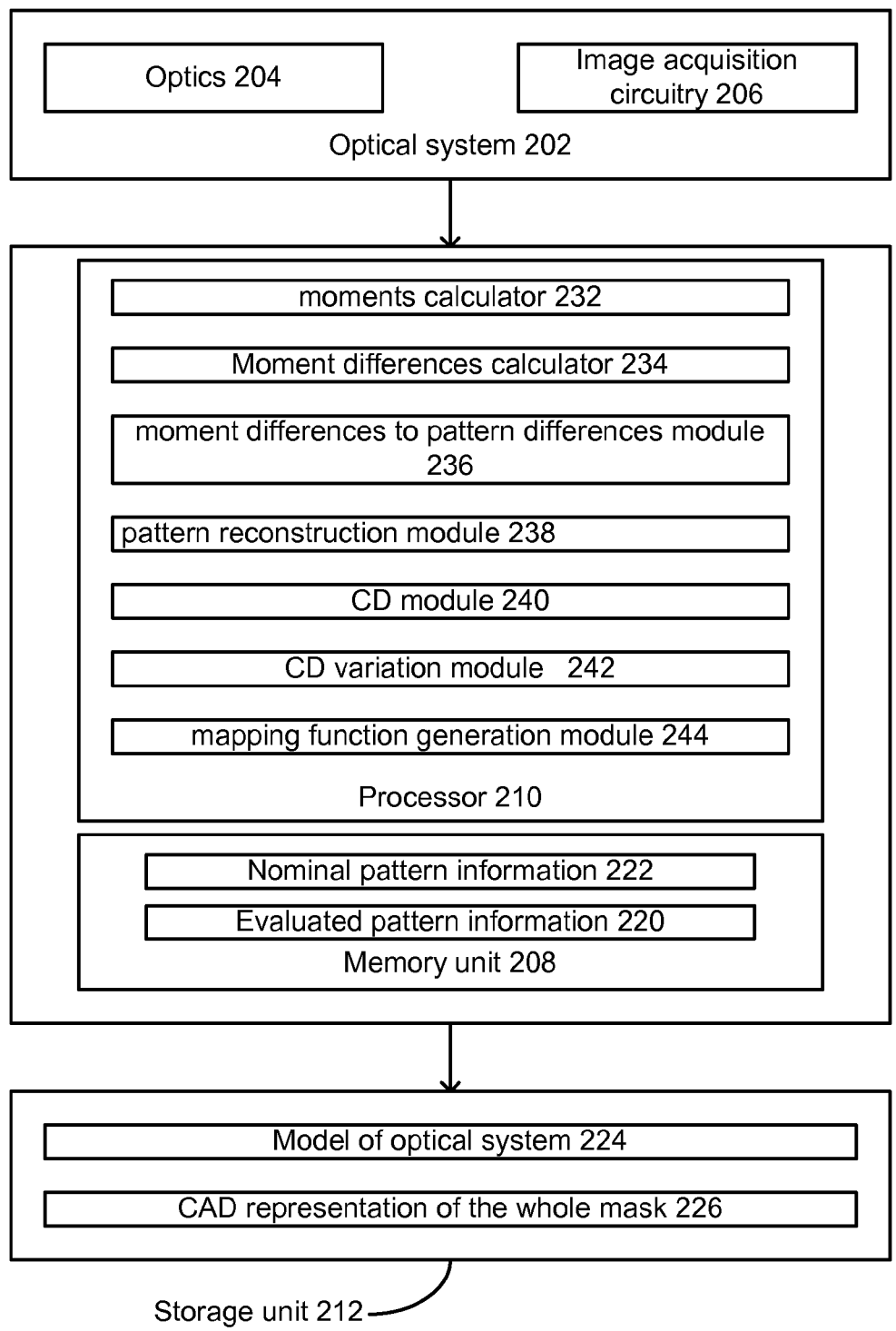
FIG. 4 illustrates a system for evaluating a pattern of a mask, according to an embodiment of the invention.

FIG. 4 illustrates system 200 for evaluating a pattern of a mask, according to an embodiment of the invention.

System 200 can include an optical system that includes optics, image acquisition circuitry and other components required to optically obtain images of evaluated patterns but this is not necessarily so. For example, system 200 can receive information representative of images of evaluated patterns that are acquired by an optical system that is not a part of system 200.

FIG. 4 illustrates system 200 as including optical system 202 (that includes optics 204 and image acquisition circuit 206), memory unit 208 and processor 210.

System 200 is illustrated as being connected to storage unit 212. Information can be allocated between memory unit 208 and storage unit 212 in different manners.

FIG. 4 illustrates memory unit 208 as storing evaluated pattern image information 220 and nominal pattern information 222 while storage unit 212 stores model 224 of optical system 202. It is noted the storage unit 212 can store a computer aided design (CAD) representation 226 of the whole mask while memory unit 208 stores only a small fraction of this information that relates to a certain nominal pattern. Conveniently, nominal pattern information 222 includes nominal moments and information that represent the shape of the nominal pattern.

System 200 can execute multiple stages of method 100. Processor 210 can process multiple moments of the evaluated patterns as well as process additional information (such as information relating to a nominal pattern) in order to determine at least one structural parameter of the evaluated pattern.

Conveniently, processor 210 can execute multiple software modules, can include dedicated hardware modules or be connected to dedicated hardware modules such as but not limited to: moments calculator 232, moment differences calculator 234, moment differences to pattern differences module 236, pattern reconstruction module 238 and additional modules such as but not limited to CD module 240, CD variation module 242, mapping function generation module 244 and the like.

Moments calculator 232 receives pixel information that form the image of a pattern (such as a nominal pattern, an altered pattern, an evaluated pattern) and calculates multiple moments (such as A0, A(1)-A(M)) that represent the image.

Moment differences calculator 234 calculates the moment differences (ΔA) between multiple moments that are calculated by moments calculator 232 (such as moments of an evaluated pattern or moments of an altered pattern) and between multiple nominal moments.

Moment differences to pattern differences module 236 applies the mapping function f in order to extract pattern differences from moment differences that were calculated by moment differences calculator 234.

Pattern reconstruction module 238 reconstructs an evaluated pattern or a modified pattern from the nominal pattern and the pattern differences that were calculated by moment differences to pattern differences module 236.

Mapping function generation module 244 learns an inverse mapping function ($f^{-1}$) by applying stages such as stage 120 of method 100. It can utilize other modules such as moments calculator 232 and moment differences calculator 234 during multiple iterations of mapping function determination process. Once the inverse mapping function is known, mapping function generation module can calculate the (non-inverse) mapping function f.

CD module 240 can calculate the critical dimension of an evaluated pattern, in response to the contour of the pattern or can calculate the distance between adjacent evaluated patterns.

CD variation module 242 can analyze CD measurements obtained from multiple patterns that are located in different locations of the mask in order to determine CD variations across the mask or across one or more portions of the mask.

Those skilled in the art will readily appreciate that various modifications and changes can be applied to the embodiments of the invention as hereinbefore described without departing from its scope defined in and by the appended claims.

The invention claimed is:

1. A method for evaluating an evaluated pattern of a mask, the method comprising:
   simulating a plurality of alterations of a nominal pattern to provide a plurality of altered patterns;
   calculating a plurality of groups of moments; each group of moments representing an image of an altered pattern out of the plurality of altered patterns;

determining a plurality of relationships; each relationship linking differences between the nominal pattern and an altered pattern and differences between the multiple nominal moments and a group of moments that represent the image of the altered pattern;

determining the mapping function in response to at least one relationship out of the plurality of relationships;

receiving or calculating, using the mapping function, multiple moments that represent an image of the evaluated pattern; wherein a size of information required for representing the multiple moments is substantially smaller than a size of pixel information that form the image of the evaluated pattern; and processing the multiple moments in order to determine at least one shape parameter of the evaluated pattern.

2. The method according to claim 1 wherein the processing comprises determining moment differences between the multiple moments of the evaluated pattern and multiple nominal moments; wherein the multiple nominal moments represent an image of a nominal pattern.

3. The method according to claim 2 wherein the determining utilizes a model of an optical system that acquired the image of the evaluated pattern.

4. The method according to claim 1 wherein the processing comprises determining pattern differences between the evaluated pattern and the nominal pattern in response to the corresponding moment differences.

5. The method according to claim 4 comprising determining the pattern differences in response to a mapping function that maps moment differences to pattern differences.

6. The method according to claim 5 wherein the mapping function is a linear function.

7. The method according to claim 1 wherein the processing comprises providing a representation of a contour of the evaluated pattern that comprises multiple vectors, each vector bisects an angle that is defined by a nominal contour.

8. The method according to claim 1 comprising calculating differences between a shape parameter of each evaluated pattern out of multiple evaluated patterns of an object.

9. The method according to claim 1 comprising comparing between multiple moments of different evaluated patterns in order to determine at least one shape parameter of an evaluated pattern.

10. A system for evaluating a evaluated pattern of a mask, the system comprising:
a memory unit adapted to store multiple moments that represent an image of the evaluated pattern; wherein a size of information required for representing the multiple moments is substantially smaller than a size of pixel information that form the image of the evaluated pattern; and a processor that is adapted receive the multiple moments from the memory unit or simulate a plurality of alterations of a nominal pattern to provide a plurality of altered patterns; calculate a plurality of groups of moments; each group of moments representing an image of an altered pattern out of the plurality of altered patterns; determine a plurality of relationships; each relationship linking a differences between the nominal pattern and an altered pattern and a differences between the multiple nominal moments and the group of moments that represent the image of the altered pattern; determine the mapping function in response to at least one relationship out of the plurality of relationships; and calculate multiple moments that represent an image of the evaluated pattern using the mapping function; the processor being further adapted to process the multiple moments in order to determine at least one shape parameter of the evaluated pattern.

11. The system according to claim 10 wherein the processor is adapted to determine moment differences between the multiple moments of the evaluated pattern and multiple nominal moments; wherein the multiple nominal moments represent an image of a nominal pattern.

12. The system according to claim 11 wherein the processor is adapted to determine the moment differences by utilizing a model of an optical system that acquired the image of the evaluated pattern.

13. The system according to claim 10 wherein the processor is adapted to determine pattern differences between of the evaluated pattern and the nominal pattern in response to the moment differences.

14. The system according to claim 13 wherein the processor is adapted to determine the pattern differences in response to a mapping function that maps moment differences to pattern differences.

15. The system according to claim 14 wherein the processor is adapted to apply a linear mapping function.

16. The system according to claim 10 wherein the processor is adapted to provide a representation of the contour of the evaluated pattern that comprises multiple vectors, each vector bisects an angle that is defined by a nominal contour.

17. The system according to claim 10 wherein the processor is adapted to calculate differences between a shape parameter of each evaluated pattern out of multiple evaluated patterns of an object.

18. The system according to claim 10 wherein the processor is adapted to compare between multiple moments of different evaluated patterns in order to determine at least one shape parameter of an evaluated pattern.

19. A computer program product comprising a computer useable medium having a computer readable program, wherein the computer readable program, when executed on a computer, causes the computer to: simulate a plurality of alterations of a nominal pattern to provide a plurality of altered patterns; calculate a plurality of groups of moments; each group of moments representing an image of an altered pattern out of the plurality of altered patterns; determine a plurality of relationships; each relationship linking differences between the nominal pattern and an altered pattern and differences between the multiple nominal moments and a group of moments that represent the image of the altered pattern; determine the mapping function in response to at least one relationship out of the plurality of relationships; receive or calculate, using the mapping function, multiple moments that represent an image of the evaluated pattern; wherein a size of information required for representing the multiple moments is substantially smaller than a size of pixel information that form the image of the evaluated pattern; and process the multiple moments in order to determine at least one shape parameter of the evaluated pattern.

20. The computer program product according to claim 19 that causes the computer to: determine moment differences between the multiple moments of the evaluated pattern and multiple nominal moments; wherein the multiple nominal moments represent an image of a nominal pattern.

21. The computer program product according to claim 20 that causes the computer to determine the moment differences by utilizing a model of an optical system that acquired the image of the evaluated pattern.

22. The computer program product according to claim 19 that causes the computer to determine pattern differences between of the evaluated pattern and the nominal pattern in response to the moment differences.

23. The computer program product according to claim 22 that causes the computer to determine the pattern differences in response to a mapping function that maps moment differences to pattern differences.

24. The computer program product according to claim 23 wherein the mapping function is a linear function.

25. The computer program product according to claim 19 that causes the computer to provide a representation of the contour of the evaluated pattern that comprises multiple vectors, each vector bisects an angle that is defined by a nominal contour.

26. The computer program product according to claim 19 that causes the computer to calculate differences between a shape parameter of each evaluated pattern out of multiple evaluated patterns of an object.

27. The computer program product according to claim 19 that causes the computer to compare between multiple moments of different evaluated patterns in order to determine at least one shape parameter of an evaluated pattern.

* * * * *